US010055778B1

(12) United States Patent
Dillon

(10) Patent No.: US 10,055,778 B1
(45) Date of Patent: Aug. 21, 2018

(54) SCORING RECOMMENDATIONS AND EXPLANATIONS WITH A PROBABILISTIC USER MODEL

(71) Applicant: Versata Development Group, Inc., Austin, TX (US)

(72) Inventor: Thomas H. Dillon, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

(21) Appl. No.: 14/257,310

(22) Filed: Apr. 21, 2014

Related U.S. Application Data

(63) Continuation of application No. 13/176,448, filed on Jul. 5, 2011, now Pat. No. 8,799,096, which is a (Continued)

(51) Int. Cl.
*G06Q 30/06* (2012.01)

(52) U.S. Cl.
CPC .................. *G06Q 30/0631* (2013.01)

(58) Field of Classification Search
CPC . G06Q 30/00; G06Q 30/0631; G06Q 30/0282
(Continued)

(56) References Cited

U.S. PATENT DOCUMENTS 6,412,012 B1 * 6/2002 Bieganski et al. ............ 709/232
6,636,836 B1 * 10/2003 Pyo .............................. 705/7.29
(Continued)

OTHER PUBLICATIONS

Request for Continued Examination (RCE) filed in U.S. Appl. No. 13/176,448, dated May 29, 2012, pp. 1-11.
(Continued)

*Primary Examiner* — Mila Airapetian
(74) *Attorney, Agent, or Firm* — Terrile, Cannatti & Chambers, LLP; Kent B. Chambers

(57) ABSTRACT

A data processing system generates recommendations for on-line shopping by scoring recommendations matching the customer's cart contents using by assessing and ranking each candidate recommendation by the expected incremental margin associated with the recommendation being issued (as compared to the expected margin associated with the recommendation not being issued) by taking into consideration historical associations, knowledge of the layout of the site, the complexity of the product being sold, the user's session behavior, the quality of the selling point messages, product life cycle, substitutability, demographics and/or other considerations relating to the customer purchase environment. In an illustrative implementation, scoring inputs for each candidate recommendation (such as relevance, exposure, clarity and/or pitch strength) are included in a probabilistic framework (such as a Bayesian network) to score the effectiveness of the candidate recommendation and/or associated selling point messages by comparing a recommendation outcome (e.g., purchase likelihood or expected margin resulting from a given recommendation) against a non-recommendation outcome (e.g., the purchase likelihood or expected margin if no recommendation is issued). In addition, a probabilistic framework may also be used to select a selling point message for inclusion with a selected candidate recommendation by assessing the relative strength of the selling point messages by factoring in a user profile match factor (e.g., the relative likelihood that the customer matches the various user case profiles).

18 Claims, 7 Drawing Sheets

Related U.S. Application Data continuation of application No. 12/683,556, filed on Jan. 7, 2010, now Pat. No. 7,983,952, which is a continuation of application No. 11/144,455, filed on Jun. 3, 2005, now Pat. No. 7,676,400.

(58) Field of Classification Search
USPC .................................... 705/26.1, 26.7, 347
See application file for complete search history.

(56) References Cited

U.S. PATENT DOCUMENTS

| | | | |
|---|---|---|---|
| 6,836,773 B2* | 12/2004 | Tamayo et al. | |
| 7,475,027 B2* | 1/2009 | Brand | ........................ 705/7.29 |
| 8,914,383 B1* | 12/2014 | Weinstein | ........... G06F 17/3089 |
| | | | 705/7.42 |
| 2002/0010625 A1* | 1/2002 | Smith | .................... G06Q 30/02 |
| | | | 705/14.52 |
| 2002/0161664 A1* | 10/2002 | Shaya | .................... G06Q 30/02 |
| | | | 705/7.31 |
| 2005/0144295 A1* | 6/2005 | Tsunoda | ............ G06F 17/30702 |
| | | | 709/228 |

OTHER PUBLICATIONS

Notice of Allowance mailed in U.S. Appl. No. 13/176,448 dated Mar. 26, 2014, pp. 1-11.
Notice of Allowance mailed in U.S. Appl. No. 13/176,448 dated Nov. 25, 2013, pp. 1-20.
Notice of Allowance mailed in U.S. Appl. No. 13/176,448 dated Feb. 28, 2012, pp. 1-17.
Notice of Allowance mailed in U.S. Appl. No. 12/683,556 dated Mar. 10, 2011, pp. 1-10.
Response to Non-Final Office Action dated Aug. 11, 2010, as filed in U.S. Appl. No. 12/683,556 on Jan. 11, 2011, pp. 1-11.
Non-Final Office Action dated Aug. 11, 2010, mailed in U.S. Appl. No. 12/683,556, pp. 1-14.
Notice of Allowance dated Oct. 21, 2009, mailed in U.S. Appl. No. 11/144,455, pp. 1-89.
Response to Restriction Requirement dated Aug. 4, 2009, as filed in U.S. Appl. No. 11/144,455 on Sep. 4, 2009, 1 page.
Non-Final Office Action dated Oct. 7, 2008, mailed in U.S. Appl. No. 11/955,599, pp. 1-19.
Response to Non-Final Office Action dated Oct. 7, 2008, as filed in U.S. Appl. No. 11/955,599 dated Apr. 4, 2009, pp. 1-17.
Terminal Disclaimer Review Decision dated May 5, 2009, mailed in U.S. Appl. No. 11/955,599, p. 1.
Requirement for Restriction dated Jul. 10, 2009, mailed in U.S. Appl. No. 11/955,599, pp. 1-6.
Response to Requirement for Restriction dated Jul. 10, 2009, as filed in U.S. Appl. No. 11/955,599 dated Aug. 10, 2009, p. 1.
Final Office Action dated Jan. 11, 2010, mailed in U.S. Appl. No. 11/955,599, pp. 1-23.
Request for Continued Examination (RCE) and RCE Submission as filed in U.S. Appl. No. 11/955,599 dated Jul. 9, 2010, pp. 1-13.
Non-Final Office Action dated Oct. 5, 2010, mailed in U.S. Appl. No. 11/955,599, pp. 1-18.
Response to Non-Final Office Action dated Oct. 5, 2010, as filed in U.S. Appl. No. 11/955,599 dated Apr. 5, 2011, pp. 1-20.
Final Office Action dated Jun. 24, 2011, mailed in U.S. Appl. No. 11/955,599, pp. 1-38.
Request for Continued Examination (RCE) and RCE Submission as filed in U.S. Appl. No. 11/955,599 dated Dec. 27, 2011, pp. 1-21.
Non-Final Office Action dated Feb. 21, 2012, mailed in U.S. Appl. No. 11/955,599, pp. 1-29.
Response to Non-Final Office Action dated Feb. 21, 2012, as filed in U.S. Appl. No. 11/955,599 dated Aug. 21, 2012, pp. 1-18.
Final Office Action dated Dec. 6, 2012, mailed in U.S. Appl. No. 11/955,599, pp. 1-17.
Response to Final Office Action dated Dec. 6, 2012, as filed in U.S. Appl. No. 11/955,599 dated Apr. 8, 2013, pp. 1-20.
Advisory Action dated Apr. 25, 2013, mailed in U.S. Appl. No. 11/955,599, pp. 1-3.
Request for Continued Examination (RCE) and RCE Submission as filed in U.S. Appl. No. 11/955,599 dated Jun. 6, 2013, pp. 1-24.
Non-Final Office Action dated Jul. 9, 2013, mailed in U.S. Appl. No. 11/955,599, pp. 1-21.
Preliminary Amendment as filed in U.S. Appl. No. 12/540,727 dated Aug. 13, 2009, pp. 1-7.
Non-Final Office Action dated Sep. 17, 2010, mailed in U.S. Appl. No. 12/540,727, pp. 1-20.
Response to Non-Final Office Action dated Sep. 17, 2010, as filed in U.S. Appl. No. 12/540,727 dated Mar. 17, 2011, pp. 1-9.
Terminal Disclaimer Review Decision dated Mar. 17, 2011, mailed in U.S. Appl. No. 12/540,727 dated Mar. 17, 2011, 1 page.
Final Office Action dated May 27, 2011, mailed in U.S. Appl. No. 12/540,727, pp. 1-16.
Request for Continued Examination (RCE) and RCE Submission as filed in U.S. Appl. No. 12/540,727 dated Nov. 28, 2011, pp. 1-18.
Non-Final Office Action dated Feb. 17, 2012, mailed in U.S. Appl. No. 12/540,727, pp. 1-21.
Response to Non-Final Office Action dated Feb. 17, 2012, as filed in U.S. Appl. No. 12/540,727 dated Aug. 16, 2012, pp. 1-17.
Final Office Action dated Dec. 6, 2012, mailed in U.S. Appl. No. 12/540,727, pp. 1-22.
Response to Final Office Action dated Dec. 6, 2012, as filed in U.S. Appl. No. 12/540,727 dated Apr. 8, 2013, pp. 1-18.
Advisory Action dated Apr. 25, 2013, mailed in U.S. Appl. No. 12/540,727, pp. 1-3.
Request for Continued Examination (RCE) and RCE Submission as filed in U.S. Appl. No. 12/540,727 dated Jun. 6, 2013, pp. 1-30.
Response to Notice of Non-Compliant Amendment as filed in U.S. Appl. No. 12/540,727 dated Jul. 29, 2013, pp. 1-13.
Non-Final Office Action dated Oct. 1, 2013, mailed in U.S. Appl. No. 12/540,727, pp. 1-24.
Response to Non-Final Office Action dated Oct. 1, 2013, as filed in U.S. Appl. No. 12/540,727 dated Mar. 3, 3014, pp. 1-21.
Notice of Allowance dated May 29, 2014, mailed in U.S. Appl. No. 12/540,727, pp. 1-20.
Notice of Withdrawal from Allowance dated Jul. 23, 2014, mailed in U.S. Appl. No. 12/540,727, p. 1.
Non-Final Office Action dated Sep. 16, 2014, mailed in U.S. Appl. No. 12/540,727, pp. 1-8.

* cited by examiner

SCORING RECOMMENDATIONS AND EXPLANATIONS WITH A PROBABILISTIC USER MODEL

CROSS-REFERENCE TO RELATED APPLICATIONS

This application is a continuation of application Ser. No. 13/176,448, filed Jul. 5, 2011, which is a continuation of Ser. No. 12/683,556, filed Jan. 7, 2010, now U.S. Pat. No. 7,983,952, which is a continuation of application Ser. No. 11/144,455, filed Jun. 3, 2005, now U.S. Pat. No. 7,676,400. All of these applications are incorporated herein by reference in their entirety.

BACKGROUND OF THE INVENTION

Field of the Invention

The present invention relates to the use of computer systems to facilitate the recommendation of goods or services. In one aspect, the present invention relates to a system and method for generating purchase recommendations by using historical transaction data and additional information relevant to the purchase environment as scoring criteria to determine the relative effectiveness of any recommendation and/or selling point message.

Description of the Related Art

Conventional computer-based approaches for providing purchase recommendations on web sites to customers have traditionally used historical transaction data to generate association rules that are used, alone or in combination of customer-input profile information, to generate one or more recommendations for consideration by the customer. When there are multiple recommendations available for customer consideration, the recommendations may be ranked using selected scoring criteria (such as margin or expected margin) to select and prioritize the candidate recommendations by multiplying the profit value and purchase probability for the recommended item. One drawback from the conventional approach of relying on customer-input profile information is that the data provided by the customer may be incomplete, or may not fully characterize the customer's profile. Also, conventional recommendation selection processes may waste a recommendation on something that is already prominent on the site and that the user has already had prior chances to buy; or may waste a recommendation on something that is already well understood and that will not benefit from further explanation; or may fail to choose a selling message that is customized for the user. In addition, conventional selection processes use a predetermined selling point message for each recommended item that is neither optimized for the customer nor taken into account in the selection process.

As seen from the conventional approaches, a need exists for methods and/or apparatuses for improving the generation and scoring of recommendations and selling point messages. There is also a need for more sophisticated identification of recommendations which focuses the presentation of recommendations to customers so that recommendations have an improved chance of being accepted by being presented in a compelling and coherent way. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for scoring and selecting recommendations by assessing how the issuance of a recommendation will increase the likelihood of purchase over the likelihood of purchase if the recommendation is not made. In assessing the purchase likelihood, a variety of scoring inputs can be used to model the gating factors in the customer decision process, including but not limited to the relevance, exposure and/or clarity of each recommendation, each or which is described further herein. In a selected embodiment, a probabilistic framework is used to maximize the expected incremental margin of a recommendation being issued (as compared to the recommendation not being issued) by taking into consideration historical associations, knowledge of the layout of the site, the complexity of the product being sold, the user's session behavior, the quality of the selling point messages, product life cycle, substitutability, demographics and/or other considerations relating to the customer purchase environment. In addition or in the alternative, the assessment of a recommendation may involve an optimization or selection of a selling point message from a plurality of selling point messages for a given recommended item based on an assessment of the likely user profile and/or a consideration of the relative strength of the potential selling point messages. By evaluating a candidate recommendation and/or selling point message in terms of the incremental expected profit margin for each recommendation/selling point message resulting from the recommendation/selling point message being issued, as compared to it not being issued, the effectiveness of the recommendation/selling point message may be assessed.

The objects, advantages and other novel features of the present invention will be apparent from the following detailed description when read in conjunction with the appended claims and attached drawings.

DETAILED DESCRIPTION

An improved method and apparatus are described for scoring recommendations and/or associated selling point messages to maximize expected incremental margin from issuing a recommendation by using a probabilistic user model that takes into account a variety of information sources, including historical associations, prior exposure to the recommended items, the complexity of the recommended items being sold, the user's session behavior, the quality of the selling points, product life cycle, demographics, etc. While various details are set forth in the following description, it will be appreciated that the present invention may be practiced without these specific details. In addition, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, assessing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
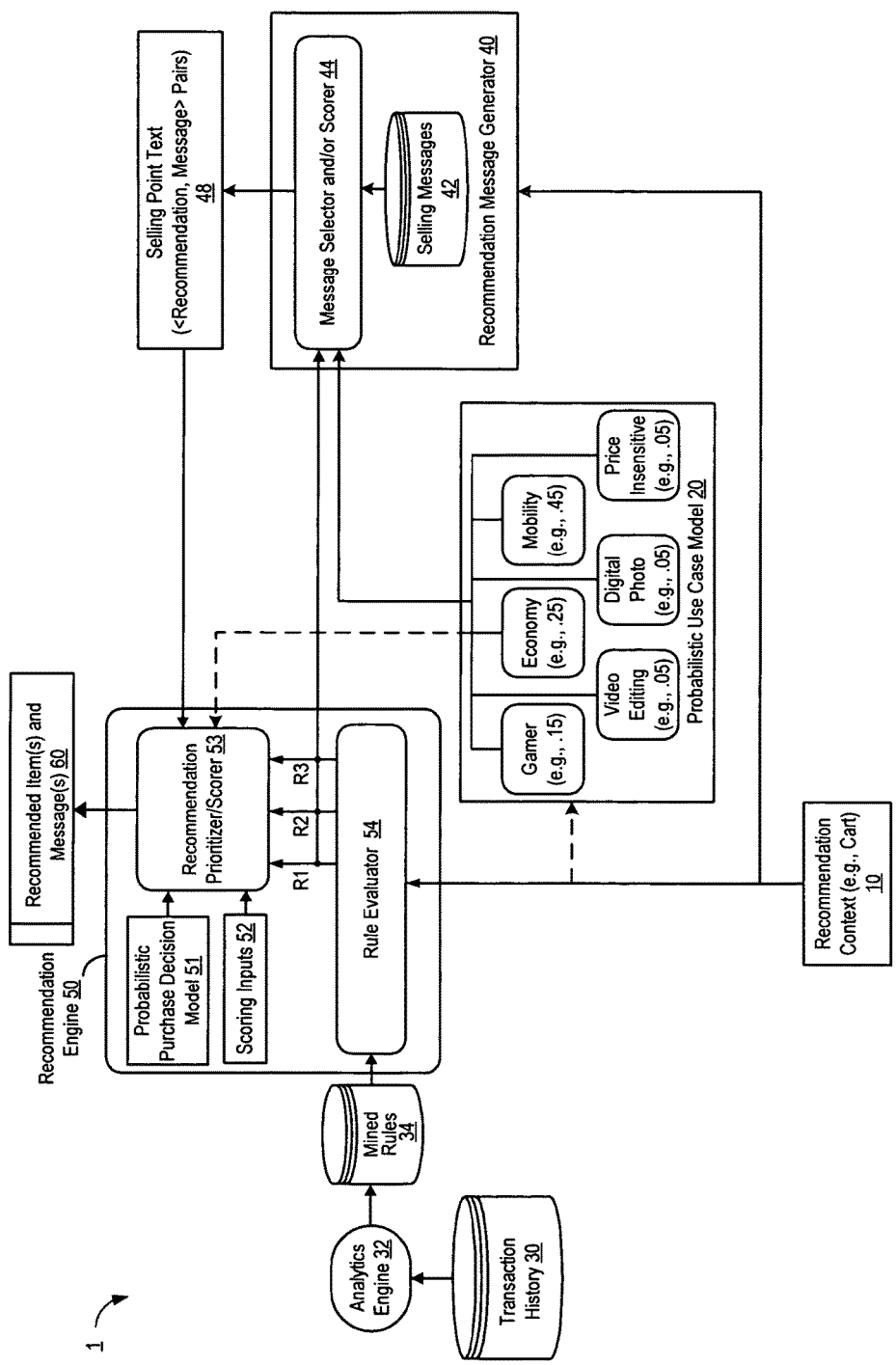
FIG. 1 illustrates an exemplary recommendation system for creating and prioritizing relevant, specific and effective recommendations and/or selling point messages.

Referring now to FIG. 1, a block diagram illustrates an exemplary recommendation system 1 for creating and prioritizing relevant, specific and effective recommendations. In addition to using historical association rules developed from transaction information (e.g., order history information, catalog information and/or customer order-related information), the system 1 also uses other scoring inputs in combination with a probabilistic use case model and/or probabilistic purchase decision model (such as a Bayesian network) to score the effectiveness of candidate recommendations and/or associated selling point messages by comparing a recommendation outcome (e.g., purchase likelihood or expected margin resulting from a given recommendation) against a non-recommendation outcome (e.g., the purchase likelihood or expected margin if no recommendation is issued). In a selected embodiment, the effectiveness of a particular recommendation may be evaluated with reference to selected gating factors in a user's purchase decision, such as a scoring input that is a quantitative or qualitative measure of the exposure for a recommended item, which refers to the visibility of the item to the user, either historically or in the future (e.g., is a user likely to have seen the recommended item on a web site). In addition or in the alternative, the scoring inputs may include a quantitative or qualitative measure of the item's clarity, which is the user's historical or future familiarity or understanding of a recommended item (e.g., is the recommended item a new or complex product that is not understood by the user). When scoring input(s) are used that can be affected by the recommendation being issued, an incremental expected margin associated with a recommendation may be obtained by calculating the expected margin for an item if it is not recommended (based on the scoring input for the "no recommendation issued" condition) and subtracting that amount from the expected margin of an item if it is recommended (based on the scoring input for the "recommendation issued" condition).

In the exemplary implementation depicted in FIG. 1, the recommendation system 1 may include a rule evaluator module that produces a set of candidate recommendations, a message selector module that uses a probabilistic use case model to choose, for each candidate recommendation, the best selling message, and a recommendation selector module uses a probabilistic purchase decision model to choose the best <recommendation, message> pair for issuance as one or more recommendations. While the recommendation system 1 may be implemented with these three component modules, it is also contemplated that one or more of the component modules may be rolled into a single probabilistic model.

The recommendation system 1 responds to user input 10 to generate recommendations 60 using an analytics engine 32 that processes historical transaction data 30 to generate mined rules 34, a recommendation message generator 40 and a recommendation engine 50. In operation, the recommendation system 1 inspects the user's recommendation context 10 (such as items in a user's shopping cart, a product page being viewed by the customer on the web, a configuration page, an e-mail sent as part of a marketing campaign and/or the user's session history). The recommendation engine 50 then evaluates which association rules 34 match the recommendation context 10 at the rule evaluator 54 and completes the matching rules (e.g., R1) by choosing one or more specific parts that satisfy the rule. As described below, one or more completed recommendation rules (e.g., R1) may be provided to the recommendation message generator 40 (to assist with selection of the selling point text using a probabilistic use case model, as described below) and to the recommendation prioritizer 53 which scores and filters the completed, matching recommendations/messages to choose the recommendations/messages that most effectively increase the purchase probability and/or expected margin. In this way, each completed rule may be used to recommend additional up-sell or cross-sell items, thereby increasing some financial metric, such as the total order size and/or the profit margin of the order.

Because there can be many recommendation rules that match a given recommendation context, the matching recommendation rules may be scored so that one or more recommendations (a configurable number) may be selected for display to the customer. Under the selection process, the matching recommendation rules R1-R3 may be filtered and/or prioritized so that only the highest scoring recommendations are presented to the user. For example, the matching, completed rules may be filtered to remove rules not meeting a recommendation strength threshold (e.g., confidence threshold of 90%) and then scored on the basis of the margin for the recommended item, or on the basis of the expected margin (margin×confidence) for the rule. The prioritization process may also use various scoring criteria in prioritizing the recommendations, such as availability, item price, total purchase amount in the cart, item or total cart margin, recommendation confidence and lift, shopper profile matches, seasonality, customer history, time dependency, product marketing emphasis, product attributes, and/or item popularity. In addition, when a group of recommendations are being chosen (instead of a single recommendation), a "non-substitutability" scoring criterion may be used to determine when a second recommendation would be merely cumulative of a first recommendation (i.e., substitutable), in which case the second recommendation should not be selected. For example, if a first recommendation, A (having the highest probability of being accepted), is chosen, then a second recommendation, B (having the next highest probability of being accepted), should not necessarily be chosen if A and B are similar and substitutable. If A is relevant, then so is B, but only one will be selected. If A is not relevant, then neither is B, and neither will be chosen. To address this scenario, a non-substitutability scoring criterion may be used by the recommendation scoring process to prevent a recommendation (e.g., cumulative recommendation B) from being wasted. Additional details concerning the use of various scoring criteria to prioritize recommendations is set forth in U.S. patent application Ser. No. 10/912,734 (entitled "System and Method for Generating Effective Recommendations"), which is assigned to Trilogy Development Group and is hereby incorporated by reference in its entirety.

As will be appreciated, a prioritization process that relies on expected margin to score recommendations may select a recommendation for an item that was likely to be purchased, even if the recommendation was not issued. Given the limited user interface "real estate" available for issuing recommendations, this would amount to a wasted recommendation. To avoid wasting recommendations, the overriding criterion should be to select recommendations that will actually improve the chance of the recommended item being purchased over whatever baseline purchase probability exists for the items. Accordingly, the selection process of the present invention may be implemented to prioritize each completed recommendation rule in terms of the boost in expected margin resulting from the recommendation being issued, as compared to no recommendation being issued.

The disclosed recommendation prioritization of the present invention may use any of a variety of scoring criteria to model the gating factors in a user's purchase decision, but in accordance with an exemplary embodiment, the scoring criteria for a candidate recommendation may include a relevance measure (i.e., the likelihood that the user needs or requires the candidate recommendation item), an exposure measure (i.e., the user's likelihood of being aware of candidate recommendation item) and/or a clarity measure (i.e., the user's likelihood of understanding candidate recommendation item). Another possible scoring criterion as indicated by the dashed line between the probabilistic use case model 20 and the recommendation engine 50) is the quantification of the user's goals in terms the probabilities that the customer matches with various predetermined use case scenarios generated by the probabilistic use case model 20. The use cases may be derived in whole or in part from the recommendation context 10 (which specifies information about the user, the user history, the web session, etc.) and/or from other historical transaction data 30. This is depicted in FIG. 1 where the user input 10 is optionally provided as an input to a probabilistic use case model 20 which models a probabilistic representation of how the user matches one or more possible use cases. Alternatively, the probabilistic use case model 20 outputs are modeled in whole or in part, based on historical transaction data obtained from other purchasers. Examples of such use cases for a computer retail recommendation system include gaming, video editing, digital photography, digital music, publishing, video conference, home office, price insensitive, mobility, space, reliability, etc.

An exemplary embodiment of the prioritization process uses one or more of three criteria (relevance, exposure and clarity) to score the recommendations in terms of the increased probability of product purchase that would be provided by making a recommendation, as compared to not making the recommendation. In this context, it is understood that a customer is more likely to buy an item if the item is relevant to the customer's needs, so the "relevance" criterion refers to a quantified estimate or measurement of how closely a recommended item corresponds to the customer's needs or user case profile. The likelihood that the candidate recommended item is relevant to the customer may be derived using conventional association rule mining techniques to obtain some quantification or measure of the item's relevance. In addition, the quantification of an item's relevance may also be influenced by what the customer has already sought or selected, by the item's prior clarity and exposure (which results from a customer having previously seen the item on the web site), by the prior purchase status for the item, or other factors.

Because an item may be relevant without the customer appreciating this fact, the customer may not accept a recommendation to purchase a highly relevant item if the customer is not familiar with the item (either because of its complexity or because it is a new product). Conversely, the chances of a customer buying an item will improve if the customer understands how the item meets his needs. To account for this factor in the purchase decision process, a "clarity" scoring criterion may be used in the prioritization process as a quantified or estimated measurement of the item's complexity and/or the customer's product familiarity or sophistication.

Another factor in the purchase decision process is the amount of exposure an item has in the customer's shopping experience. When a customer's shopping experience occurs on a web site, the quantification of an item's exposure may be influenced by the site design and/or the customer's session history. The more exposure an item has, the more likely it is to be purchased, although at some point, the fact that a heavily exposed item has not been purchased may indicate that the item is not likely to be purchased since prior purchase opportunities have not been accepted. On the other hand, the prior exposure to an item may indicate that the customer has been researching the item, and is now returning to purchase the item. To account for this factor in the purchase decision process, an "exposure" scoring criterion may be provided as a quantified measurement of an item's presence in the customer's shopping experience, whether past or future.

Other scoring criteria may be used to model the gating factors in a customer's purchase decision process. For example, a measure of the confidence in the relevance of the candidate recommendation may be used to quantify how strongly relevant the candidate recommended item is to the customer: Also, a session age criteria may quantify or estimate the length of a given shopping session in order to factor in the probability that an item has not previously been purchased because the customer hasn't yet had enough time to make the purchase. Alternatively, a session age criterion may indicate that a candidate recommended item is not likely to be purchased if enough time has passed in the current shopping session to indicate that the customer may not be interested in the item. In addition, the quality of a proposed selling point message (weak, ok or strong) and/or the salience of how the recommendation is presented (e.g., low or high visibility) may be used as scoring factor. It may be also be useful to quantify or estimate the probability that the candidate recommended item is already owned by the user, based on past orders, or based on market penetration/maturity data for the item in question.

In accordance with a selected embodiment of the present invention, the various scoring criteria may be connected and configured as a Bayesian network. In such a configuration, mutual interdependencies will exist between the scoring criteria, depending on the structure and arrangement of the scoring criteria in the network. For example, given the fact that the candidate recommended item has not yet been selected when the recommendation selection decision point is reached, the issuance of a recommendation will increase the exposure of the recommended item (by presenting the item prominently) and increase the clarity of the recommended item (by presenting a selling pitch). To account for this, the disclosed recommendation prioritization system and methodology separately quantifies the purchase probability for an item, both assuming the candidate recommendation is issued and assuming the candidate recommendation is not issued. The difference between these separately calculated purchase probabilities measures the boost in purchase likelihood from a recommendation.

To score a candidate recommendation for possible selection as the recommendation(s) at a particular decision point (i.e., when deciding what to show in a popup), a selected embodiment of the present invention uses the following parameters to quantify the boost in probability of a product being purchased if it is recommended:

priorExposure=the exposure the item has already received up until the decision point. This parameter may be based on the site design and the session history.

expectedExposure=the expected exposure the item will receive after the decision point if the recommendation is not made. This parameter may be based on the site design and/or the session history.

postExposure=the exposure the item will receive after the decision point if the recommendation is made. This parameter may be based on the site design and/or the session history.

priorClarity=the clarity of the item as of the decision point. This parameter may be based on the prior exposure to item descriptions and/or a measure of the customer's sophistication or user profile.

expectedClarity=the expected clarity the item will have after the decision point if the recommendation is not made. This parameter may be based on the prior exposure to item descriptions and/or a measure of the customer's sophistication or user profile.

postClarity=the clarity the item will have after the decision point if the recommendation is made. This parameter may be based on the prior exposure to item descriptions and/or a measure of the customer's sophistication or user profile, and may also take into account the quality or score of the selling pitch.

other=other common factors like price sensitivity, availability, likelihood that the customer already owns the item, etc.

Based on the foregoing parameters, the score or value of an individual candidate recommendation may be calculated with reference to the following probabilistic score equation:

$$\text{Score} = \text{Margin} * [P(\text{purchase}|\text{relevance}, \text{postExposure}, \text{postClarity}, \text{other}) - P(\text{purchase}|\text{Relevance}, \text{expectedExposure}, \text{expectedClarity}, \text{other})]$$

where $P(\text{purchase}|X, Y, Z)$ denotes the probability of the recommended item being purchased, given the probability parameters X, Y, Z, and where "Relevance" denotes the probability that the recommendation is relevant to the customer, which may be calculated with reference to the following probabilistic Relevance equation:

$$\text{Relevance} = P(\text{relevance}|\text{associations}, \text{priorExposure}, \text{priorClarity}, \text{notYetPurchased})$$

where "notYetPurchased" is a binary parameter indicating whether or not the item has already been purchased by the customer (i.e., is contained in the cart or the customer history). As will be appreciated, by quantifying the "Relevance" probability parameter to include not only the "association" measure (such as confidence, support or lift), but also additional measures (such as priorExposure, priorClarity, notYetPurchased, etc.), a better measure of the item's relevance is provided.

As indicated above, the score or value of a recommendation may depend not only on the relevance of the item, but also on the increase in exposure and clarity that the recommendation will cause over baseline expectations. Thus, if the recommended item will have good exposure and clarity whether or not it is recommended, then the recommendation may be better spent on something else.

In addition to the scoring criteria described above, the score of a candidate recommendation may additionally depend on the quality of any associated selling point message or pitch which can improve an item's clarity if issued to the customer. To account for this in the prioritization process, a message selector 44 may be provided that uses a probabilistic use case model 20 (as indicated by the solid line between the probabilistic use case model 20 and the recommendation message generator 40) to choose, for each candidate recommendation (e.g., R1) the best selling message from the selling messages database 42, thereby generating a selling point text for each candidate recommendation in the form of a <recommendation, message> pair that best matches the likely use case for the purchaser. In addition or in the alternative, each selling point message for a candidate recommendation may include a "pitch strength" criterion that measures or quantifies the relative strength (e.g., strong, medium, weak) of the message. The pitch strength variable may be a subjective variable that is assigned when the selling messages are input to the recommendation message generator. In addition, the pitch strength criterion may be a function of not just the pitch strength variable itself, but may instead be a function of the (pitch, use case) pair. Thus, with one selling point text per use case, the selling point text is selected that is associated with the most likely use case. Alternatively, an estimate of the "goodness" could be calculated for each selling point text for each use case to select the selling point text having the best overall score as compared to all possible use cases. This can be accomplished by taking a probability distribution over all use cases for the customer, and then taking the cross product of the selling point text and the use case goodness matrix to determine the overall the expected value of each selling point text against all possible use cases. With this approach, a first selling point text associated with the most likely use case may not have the highest overall score where. This can happen, for example, when the first selling point message has a low score for the other use cases, but a second selling point message (that is associated with a less likely use case) has better overall scores for the other use cases. As indicated above, pitch strength criterion may be a factoring probability for the calculation of the postClarity measure.

In situations where there are multiple selling point messages that could be used for a particular candidate recommended item, the recommendation prioritizer 53 chooses the best selling point texts for issuance as the recommendation 60 by scoring the <recommendation, message> pairs 48 for the candidate recommendations based on the probabilistic purchase decision model 51. In addition or in the alternative, the "pitch strength" criterion may be used to prioritize the messages and thereby select an optimal selling point message. For example, if a candidate recommendation item (e.g., a color printer) has potential relevance to multiple user case profiles (e.g., a digital photographer profile and a price insensitive profile), then there should be a selling point message for each user case. With multiple potentially applicable selling point messages, the "pitch strength" criterion may be used to select the selling point message that results in the largest increase in the expected value of a recommendation. In addition or in the alternative, the relative strength of the selling point messages may be prioritized by factoring in a user profile match factor (e.g., the relative likelihood that the customer matches the various user case profiles). For example, based on the recommendation context, the respective probabilities that the customer matches with various user profiles may be calculated and applied to the respective pitch strength criteria for the candidate selling point messages to select the highest ranked message from the available selling point messages for use with candidate recommended item. As a result, a selling point message for a candidate recommended item (e.g., color printer) that is directed to a digital photographer profile is selected over a selling point message for the same item that is directed to a price insensitive profile if the probability that the customer matches the digital photographer profile is higher than the probability that the customer matches the price insensitive profile, everything else being the same. And if there are different pitch strengths for the selling point messages, then this can also be factored into the message selection process.

Figure 2:
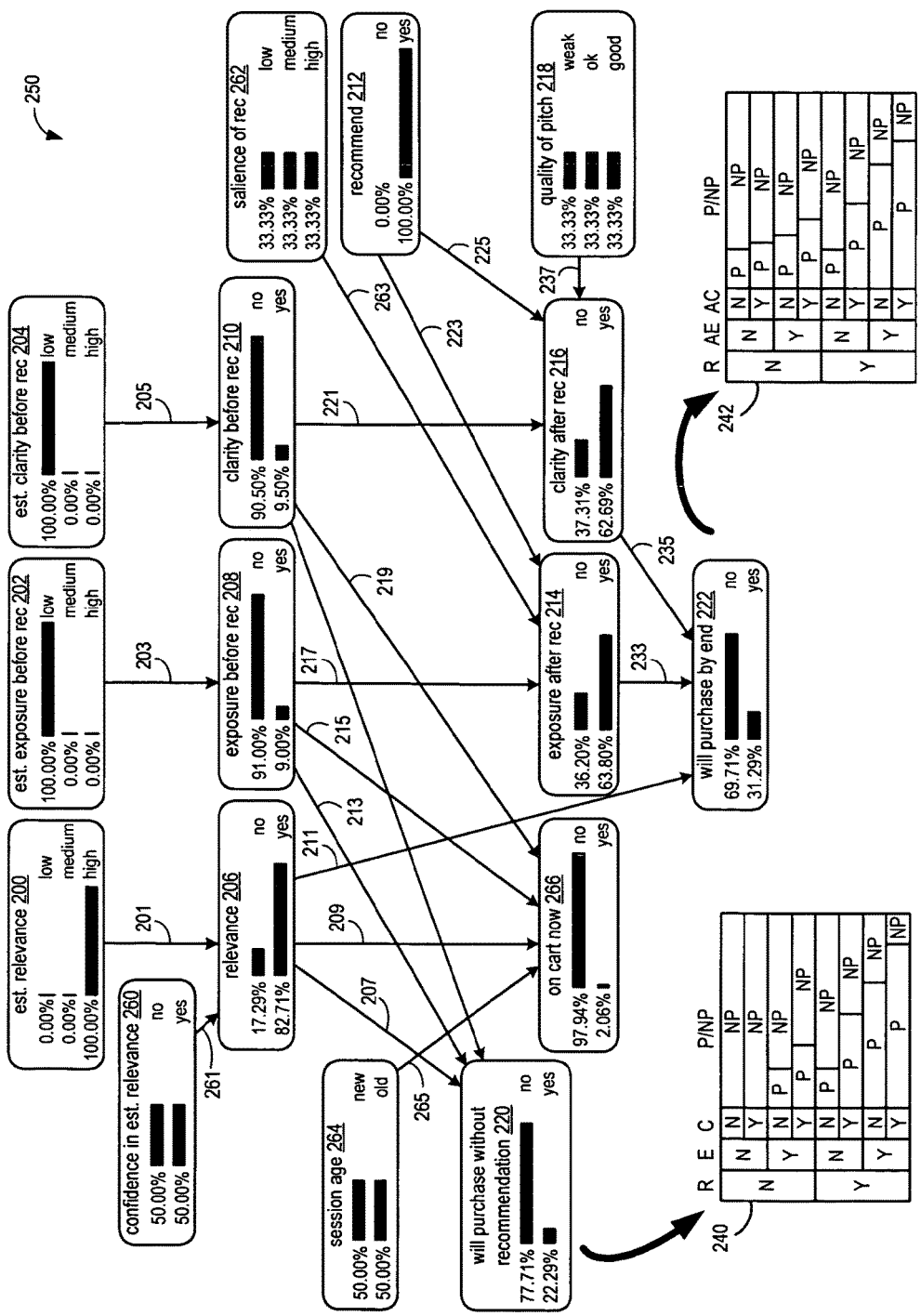
FIG. 2 illustrates an exemplary probabilistic network that may be used to process predetermined scoring criteria inputs in connection with generating and scoring effective purchase recommendations based on the purchase recommendation being issued.

In accordance with the present invention, a probabilistic framework may be used for the maximizing expected incremental margin of any issued recommendations, given the various disparate sources of information mentioned above. An example of such a probabilistic network is shown in FIG. 2, which illustrates a Bayesian network 250 for processing predetermined scoring criteria inputs to pick an effective recommendation with the greatest increase in expected value. In this example, a Bayesian network 250 represents the joint distribution over all the variables represented by nodes (200, 202, etc.) connected together by informational or causal dependency links (201, 203, etc.) in the graph. As will be appreciated, a Bayesian network or Bayesian belief network is a directed acyclic graph of nodes (e.g., 206) representing variables of interest, and arcs (e.g., 209, 211, 213) representing dependence relations among the variables (e.g., 206, 220, 266 and 222). If there is an arc from node A to another node B, then node A is referred to as a parent of node B. Nodes can represent any kind of variable (e.g., an observed measurement, a parameter, a latent variable, or a hypothesis), but are not restricted to representing random variables. For example, a node having a known value is referred to as an evidence node. The links represent informational or causal dependencies among the variables which are given in terms of conditional probabilities of states that a node can have given the values of the parent nodes. The Bayesian network 250 provides a representation of the joint distribution over all the variables $X(1)$-$X(n)$ represented by nodes in the graph 250, where the variables $X(1)$-$X(n)$ are identified by the even-numbered reference numerals (e.g., nodes 200-222). The joint distribution for $X(1)$ through $X(n)$ is represented as the product of the probability distributions $P(X(i)|parents(X(i)))$ for i from 1 to n, where the term "parents(A)" refers to the parents of the node A. The depicted network 250 may also be used to determine the conditional distribution of a subset of the variables, conditional on known values for some other subset (the evidence). To carry out numerical calculations, each node may include a parameterization table that specifies, for each node X, the probability distribution for X conditional on its parents, such as a conditional probability matrix $P=\{P(X|parents(X))\}$, where parents(X) represents the parents of X.

While the distribution of X given its parents may have any form, including discrete or Gaussian distributions, an example parameterization table 240 for node 220 is illustrated which may be used to simplify calculations of the purchase probability if no recommendation is issued, while the parameterization table 242 for node 222 may be used to simplify calculations of the purchase probability if a recommendation is issued. As seen in the parameterization table 240, only the relevance (R), exposure (E) and clarity (C) inputs are specified for the probability table 240, though other inputs could also be included as inputs. For each node 220, 222, the parameterization table is used to determine the purchase probability based upon the status of the inputs by specifying a probability output for each combination of inputs. Thus, the three inputs to node 220—relevance (R), exposure (E) and clarity (C)—are used to specify a purchase probability based on the candidate recommendation not being issued, while the three inputs to node 222—relevance (R), adjusted exposure (AE) and adjusted clarity (AC)—are used to specify a purchase probability based on the candidate recommendation being issued. As the example of table 240 illustrates, the purchase probability (P) increases in relation to the probability of no purchase (NP) as the relevance (R), exposure (E) and clarity (C) evaluate to true (Y). Conversely, the purchase probability (P) decreases in relation to NP as R, E and C evaluate to false (N).

In the example depicted in FIG. 2, the Bayesian network 250 models the relationship between the purchase probabilities for a candidate recommendation 220, 222 and the recommendation's relevance 206, as well as the exposure and clarity of the recommended item, both before and after a recommendation 212 and sales pitch 218 are made. A description of the network 250 may begin with the relevance node 206 which represents a probabilistic quantification of how relevant the candidate recommended item is to the user, based on everything that is known about the user, their history, their web session, etc., and not just the historical associations observed from the historical transactions. In an example embodiment, the relevance node 206 represents the probability that the candidate recommended item is relevant to the user, given an estimate of the relevance (parent node 200) which may be based on historical association data, the user's prior exposure to the recommended item, the existing clarity of the recommended item to the user, the probability that the recommended item has not yet been purchased and/or the user case probabilities. The estimated relevance parent node 200 is linked in the network 250 to the relevance node 206 by dependency link 201. In turn, the relevance node 206 is linked to the purchases probability nodes 220, 222 (described below) by dependency links 207, 211 to provide an input indication of the relevance of the recommended item for the purchase probability calculation.

In addition to the relevance criterion 206, an exposure node 208 is another scoring input that represents a quantification of the likelihood that user is already aware of candidate recommendation, and that may be based on an estimated salience measure (node 202). The exposure node 208 is shown as connected via dependency link 213 to node 220 which quantifies the probability that the recommended item will be purchased if a recommendation is not issued. For the calculation at node 220, the exposure node 208 represents a measure of the user's awareness of the recommended item assuming that the candidate recommendation is not issued, given an estimate of the salience of the recommendation to the customer (parent node 202). In addition, a clarity node 210 may be included as a scoring input in the network 250 to represent a quantification of the likelihood that the user understands the operation or function of the candidate recommendation item before any recommendation is issued, given an estimate of the clarity of the recommendation to the customer (parent node 204). The clarity node 210 is also shown as connected via dependency link 219 to the "no recommendation" purchase probability node 220. Because either or both of the exposure and clarity variables for a candidate recommendation will typically be increased as a result of a recommendation being issued, an adjusted exposure 214 and/or adjusted clarity node 216 may also be provided to reflect the effect of a recommendation being issued (node 212). Thus, the adjusted exposure 214 (or "postExposure" node) is provided with appropriate dependency links 217, 223 to the parent exposure node 208 (or priorExposure node) and recommendation node 212, while the adjusted clarity 216 (or "postClarity" node) is provided with appropriate dependency links 221, 225 to the parent clarity node 210 (or priorClarity node) and recommendation node 212. To account for the influence of the selling point message, the adjusted clarity node 216 in the network 250 may also be provided with a dependency link 237 to the parent pitch strength node 218. These adjusted exposure and clarity nodes 214, 216 are connected via dependency links 233, 235, respectively, to recommendation purchase probability node 222 which quantifies the probability that the recommended item will be purchased if a recommendation is issued.

FIG. 2 shows an example Bayesian network that is used as a probabilistic purchase decision model to score an example candidate recommendation. In the network 250, each candidate recommendation has an estimated relevance (node 200) and an actual relevance (node 206) representing a quantified probability that the candidate recommended item is relevant to the customer. In addition, the network 250 includes an estimated salience or exposure (node 202) and an actual exposure (node 208) representing a quantified probability that customer has previously been exposed to the candidate recommendation item, along with an estimated clarity (node 204) and an actual clarity (node 210) representing a quantified probability that customer understands how the candidate recommended item fits the customer's needs or requirement. Each node may use a parameterization table to determine its output probability based upon the status of the inputs by specifying a probability output for each combination of inputs. With the depicted network 250, the effectiveness of a candidate recommendation may be scored by subtracting a baseline purchase likelihood 220 (i.e., the purchase probability if the candidate recommendation is not issued) from the boosted purchase likelihood 222 (i.e., the purchase probability if the candidate recommendation is issued), and then multiplying the resulting difference by the margin for the recommended item.

In the example of FIG. 2, the probabilistic purchase decision model is depicted with reference to the recommendation node 212 indicating that the candidate recommendation has been issued (yes recommendation=100%). It will be appreciated that Bayesian networks may be flexibly adjusted and applied to accommodate various inputs, variables and dependency structures for use in scoring candidate recommendations. Thus, in addition to the decision nodes discussed above, the network 250 may include additional decision nodes, such as a measure of the confidence in the estimated relevance (node 260) to take into account the frequency with which the candidate recommendation occurs in the historical data. Another input provided at node 262 is used to quantify the salience of the candidate recommendation, thereby taking into account the placement and/or attractiveness of the recommendation on the user interface screen. A "session age" input 264 may also be included to quantify how old or new the current session age is. In addition, there may be a measure of the likelihood that the candidate recommended item is already in the customer's cart without the candidate recommendation being issued (node 266). Each of these additional decision nodes are optional, and are depicted in FIG. 2 as being probabilistically indeterminate.

In the example network 250 depicted in FIG. 2, the candidate recommendation has a "high" estimated relevance 200, a "low" estimated exposure 202 and a "low" estimated clarity 204, while the confidence 260, session age 264, recommendation salience 262 and quality of pitch 218 inputs are not specified. Based on the parameterization tables constructed for the decision nodes, the candidate recommended item has an 82.71% probability of being relevant (per node 206), a 9% probability of having received prior exposure (per node 208) and a 9.5% probability of already being well understood by the customer (per node 210). These decision nodes, in combination with the recommendation node 212 and other network inputs, inform the remaining decision nodes to quantify the probability that the recommended item will be purchased as a result of the candidate recommendation being issued (node 222) and the probability that the recommended item is already on the cart (node 266). In particular, node 266 indicates that there is only a 2.06% chance of the candidate recommendation item already being on the customer's cart, which reflects the relatively low prior exposure and clarity. With the recommendation node 212 indicating that the candidate recommendation is issued (100% probability of "yes"), the probability that the customer will be exposed to the candidate recommendation increases to 63.8% (node 214) and the clarity of the candidate recommendation increases to 62.69% (node 216). As a result, the purchase probability node (node 222) indicates that the probability of the candidate recommendation being accepted is 31.29%. On the other hand, if the candidate recommended item has a 82.71% probability of being relevant (node 206), a 91% probability of having prior exposure to the customer (node 208), and a 90.5% probability of having achieved a threshold level of clarity to the customer beforehand (node 210), then the candidate recommended item has a 22.29% probability of being purchased without a recommendation being issued (node 220). The difference between the calculated probabilities at nodes 220 and 222 may be used to calculate the incremental probability of a purchase resulting from the recommendation being issued. By multiplying this difference with the margin for the candidate recommendation item being scored, an incremental expected margin value is obtained that may be measured or ranked against other incremental expected margin values for other candidate recommendations. Thus, each of a plurality of candidate recommendations may be scored in a similar fashion to identify the candidate recommendation that provides the biggest boost in expected margin.

Figure 3:
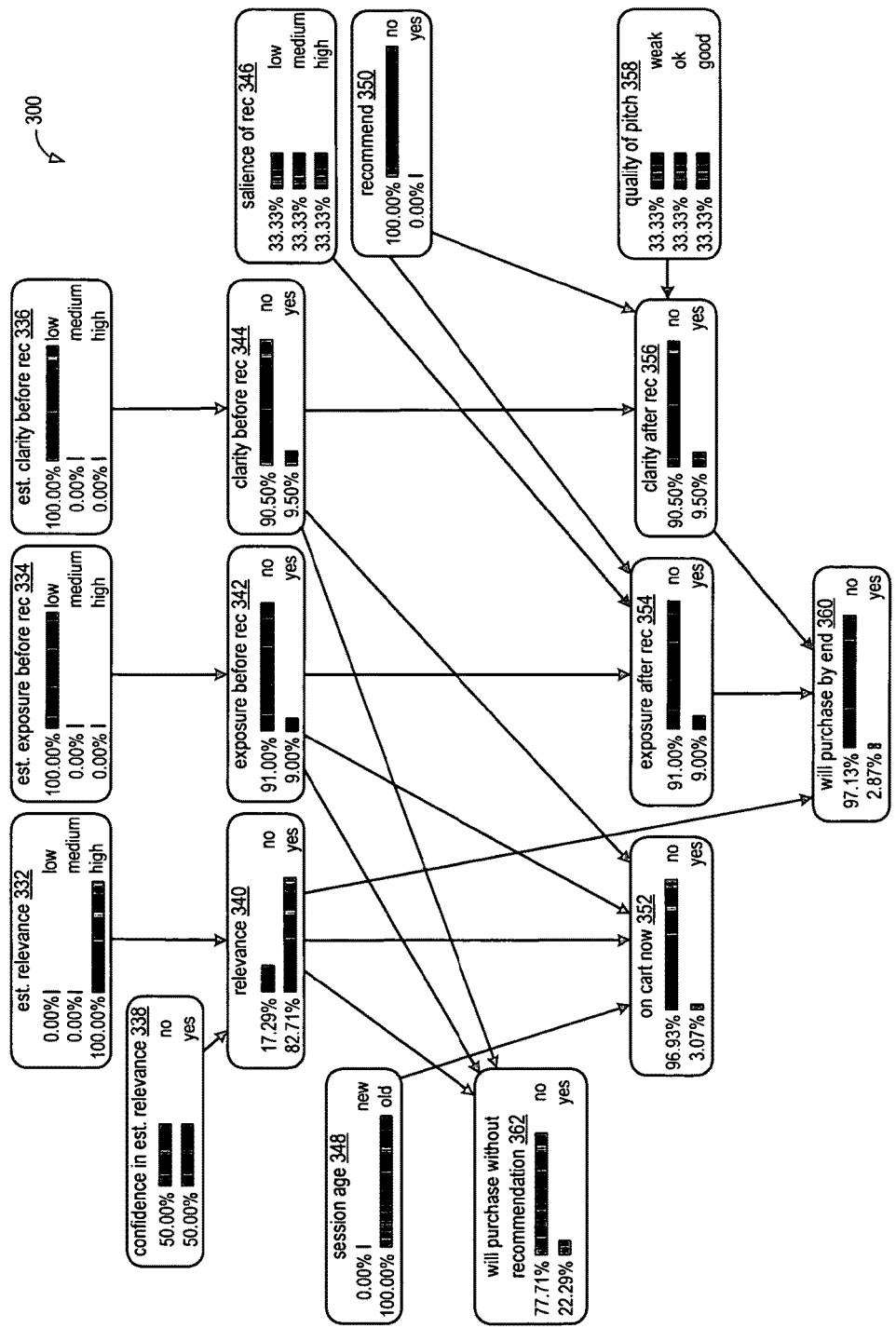
FIG. 3 illustrates an exemplary probabilistic network that may be used to process predetermined scoring criteria inputs in connection with generating and scoring effective purchase recommendations based on the purchase recommendation not being issued.

Another technique for determining the incremental probability of a purchase is depicted in FIG. 3, which shows an example Bayesian network 300 that is used as a probabilistic purchase decision model with reference to the recommendation node 350 indicating that the candidate recommendation has not been issued (no recommendation=100%). In the network 300, other inputs and dependency relationships are specified in addition to the recommendation input 350 which is used to indicate whether the candidate recommendation is issued or not, including decision nodes for quantifying the actual relevance 340, exposure 342 and clarity 344 for the candidate recommended item before it has been recommended, as well as decision node for quantifying the adjusted exposure 354 and adjusted clarity 356 for the candidate recommended item after it has been recommended. In addition, a purchase probability decision node 360 is provided to quantify the probability that the candidate recommended item will be purchased by the end of the customer session. A boost associated with each candidate recommendation may be calculated using the purchase probability node 360, alone or in combination with the decision node 352 that quantifies the probability that the candidate recommended item is already on the customer cart.

In contrast to FIG. 2, the recommendation node 350 in FIG. 3 indicates that the candidate recommendation is not issued (100% probability of "no"), the probability that the customer will nonetheless be exposed to the candidate recommendation is only 9% (node 342 or 354) and the clarity of the candidate recommendation (again, without the recommendation being issued) would be only 9.5% (node 344 or 356). As a result, the purchase probability node (node 360) indicates that the probability of the candidate recommendation being accepted is only 2.87% if the recommendation is not issued.

As will be appreciated, by specifying probability values for one of more of the network input nodes, the decision nodes connected thereto may be influenced so that different probability values are indicated at the decision nodes. For example, if the recommendation salience input 262 in FIG. 2 indicates that the location and/or presentation of the candidate recommendation will be "high" (100% probability of "high," though not shown) and node 212 indicates that a recommendation is issued, there will be an increase in the adjusted exposure probability (e.g., node 214 would indicate a 93.7% adjusted exposure probability, though not shown) and a resulting increase in the purchase probability (e.g., node 222 would indicate a 45.57% purchase probability, though not shown). And if, in addition, the quality of pitch input 218 indicates that the selling point message associated with the candidate recommendation will be "good" (100% probability of "good," though not shown), there will be an increase in the adjusted clarity probability (node 216) that the customer will be understand the need for the candidate recommended item (e.g., node 316 would indicate a 95.3% adjusted clarity probability, though not shown), along with a resulting increase in the purchase probability (e.g., node 222 would indicate a 59.98% a purchase probability, though not shown). Similarly, if the session age input 318 in FIG. 3 indicates that the current user session has passed a threshold unit of time so that the session is "old" (100% probability of "old"), there will be an increase in the probability that the candidate recommended item is already in the customer's cart without the candidate recommendation being issued (e.g., node 352 would indicate a 3.07% probability that the item is already on the cart). Finally, if the relevance confidence node 338 indicates that there is a high confidence in the relevance of the candidate recommendation (100% probability of "yes," though not shown), there will be an increase in the relevance probability (node 340) for the candidate recommendation (e.g., node 340 would indicate a 96.2% relevance probability, though not shown).

With the network configuration depicted in FIG. 2, the boost associated with each candidate recommendation may be calculated using the purchase probability node 222 by first determining the purchase probability (node 222) with the recommendation node 212 set to "yes" and then subtracting the purchase probability (node 222) with the recommendation node 212 set to "no." Alternatively, the boost for a candidate recommendation can be determined by subtracting the probability that the candidate recommended item will be on the cart without a recommendation (node 266) from the purchase probability at node 222 with the recommendation node 212 set to "yes."

Figure 4A:
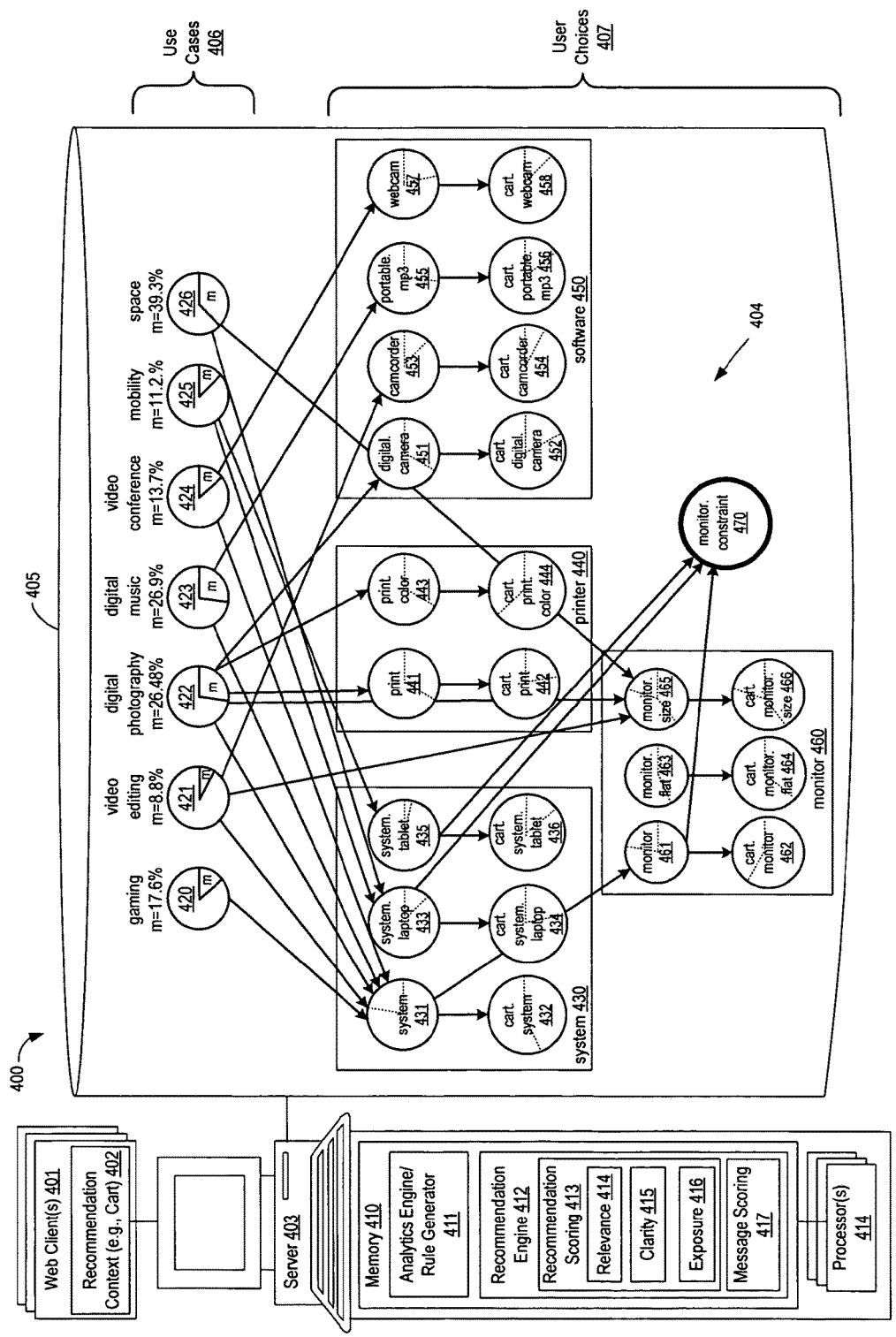
FIGS. 4(*a*) through (*c*) illustrate a data processing system for generating prioritized recommendations and associated selling messages.

Bayesian network configurations may also be used to generate and score recommendations in other ways. For example, FIG. 4(a) illustrates a system for using a plurality of use case profiles 406 and user choice options 407 in probabilistic framework 404 to score and sort recommendations and/or selling point messages. In FIG. 4(a), each node is depicted in an unobserved state in that none of the nodes have been determined or set. Each user case profile (e.g., gaming profile 420) indicates a matching probability (m) for that profile. For example, the network 404 in FIG. 4(a) shows that there is a 17.6% chance of matching the gaming profile (node 420), a 8.8% chance of matching the video editing profile (node 421), a 26.48% chance of matching the digital photography profile (node 422), a 26.9% chance of matching the digital music profile (node 423), a 13.7% chance of matching the video conference profile (node 424), a 11.2% chance of matching the mobility profile (node 425), and a 39.3% chance of matching the space profile (node 426). Each user case profile (e.g., gaming profile 420) may be connected by a dependency link to one or more items (e.g., system 431) that are user choices. The user choices are grouped (e.g., printer group 440) and include, for each item (e.g., color printer), an indication of the relevance probability for that item (e.g., print.color decision node 443) and an indication of the probability that the item will appear on the cart (e.g., print.color.cart decision node 444).

Figure 4B:
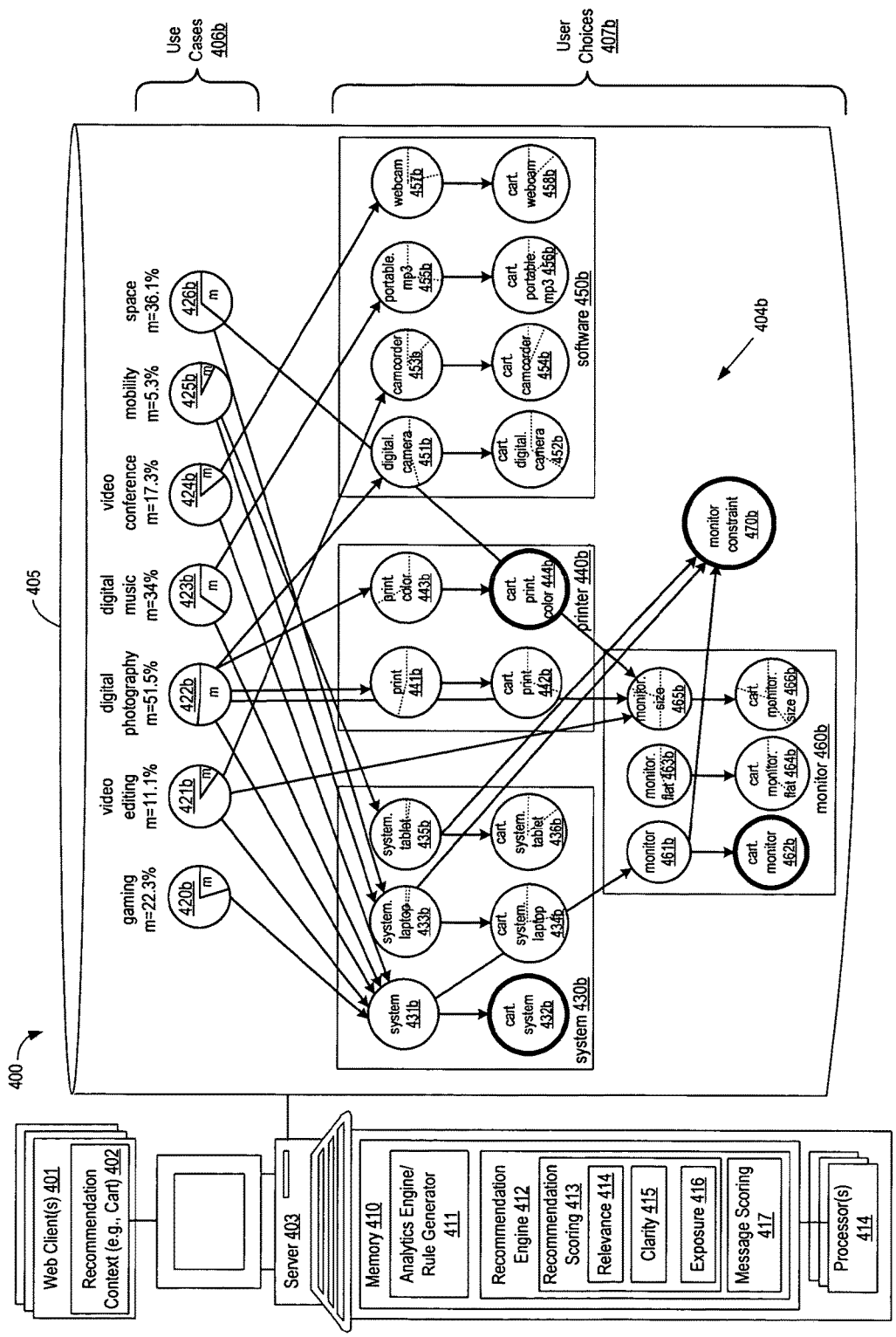

With such a network, recommendations can be generated by using recommendation context information (e.g., items in the customer's cart 402 or information derived therefrom) to set decision nodes (e.g., digital camera) in the user choices 407. A decision node is set for any item in the cart (e.g., a digital camera) by setting its cart probability node (e.g., cart.digital.camera) to a 100% probability. This is illustrated in FIG. 4(b), which shows the cart probability nodes set to 100% for cart.system 432b, cart.print.color 444b and cart.monitor 462b. Once the user choice decision nodes are set, a probability distribution over the possible use cases 406 is generated based on the contents of the cart, and the user case profiles 406b may be inspected to determine which user case profile has the highest probability. For example, FIG. 4(b) shows that there is a 22.3% chance of matching the gaming profile (node 420b), a 11.1% chance of matching the video editing profile (node 421b), a 51.5% chance of matching the digital photography profile (node 422b), a 34% chance of matching the digital music profile (node 423b), a 17.3% chance of matching the video conference profile (node 424b), a 5.3% chance of matching the mobility profile (node 425b), and a 36.1% chance of matching the space profile (node 426b). Since the digital photography profile has the highest probability score, this profile is used to identify other items in the network 404b connected to the digital photography profile by dependency link(s) (e.g., digital camera software 451b, printer 441b, monitor size 465b) for possible recommendation to the customer, based on whichever item has the best purchase probability or boost in purchase probability. As will be appreciated, the system may also evaluate and compare the purchase probability boost for items associated with the other use case profiles (e.g., the monitor 465b and system laptop 433b items associated with the "space" use case 426) in order to identify candidate recommendation items having the best purchase probability or boost in purchase probability.

As will be appreciated, a variety of different input and decision nodes can be included in the probabilistic network 404. In addition, the network may include constraint nodes (e.g., monitor constraint 470) that prevent conflicting user choices from being made. For example, if a laptop computer has been selected (resulting in the system.laptop node 433 being set), the monitor constraint node 470 will prevent conflicting items (e.g., tablet systems 433 or monitors 461) from being used as a recommendation by setting the relevance probability equal to 0% for such conflicting items. Those skilled in the art will appreciate that the probability indications from the user choices 407 and user case profiles 406 in the probabilistic network 404 (such as a Bayesian network) will change, depending on which items in the user choices are selected, as depicted in FIGS. 4(a) and (b). With this approach, the customer's purchase decisions reflected in the cart are used in combination with probabilistic network 404 to generate a probability distribution over the possible use cases 406b. This probabilistic distribution may be used to evaluate or score each sales pitch that may be paired with a candidate recommendation, where each sales pitch has a qualitative measure of the pitch strength or goodness with respect to each use case. Based on the evaluation, the sales pitch with the best score is selected for pairing with the candidate recommendation. It will be appreciated that the best pitch may or may not be associated with the most likely use case. For example, a pitch may be selected because it is a good match for the second, third, and fourth most likely use cases. In addition to identifying sales pitches, the probabilistic use case model 404 may also be used to identify the most likely matching user profile, which in turn is used to identify items corresponding to the user profile for possible recommendation and/or scoring.

Figure 4C:
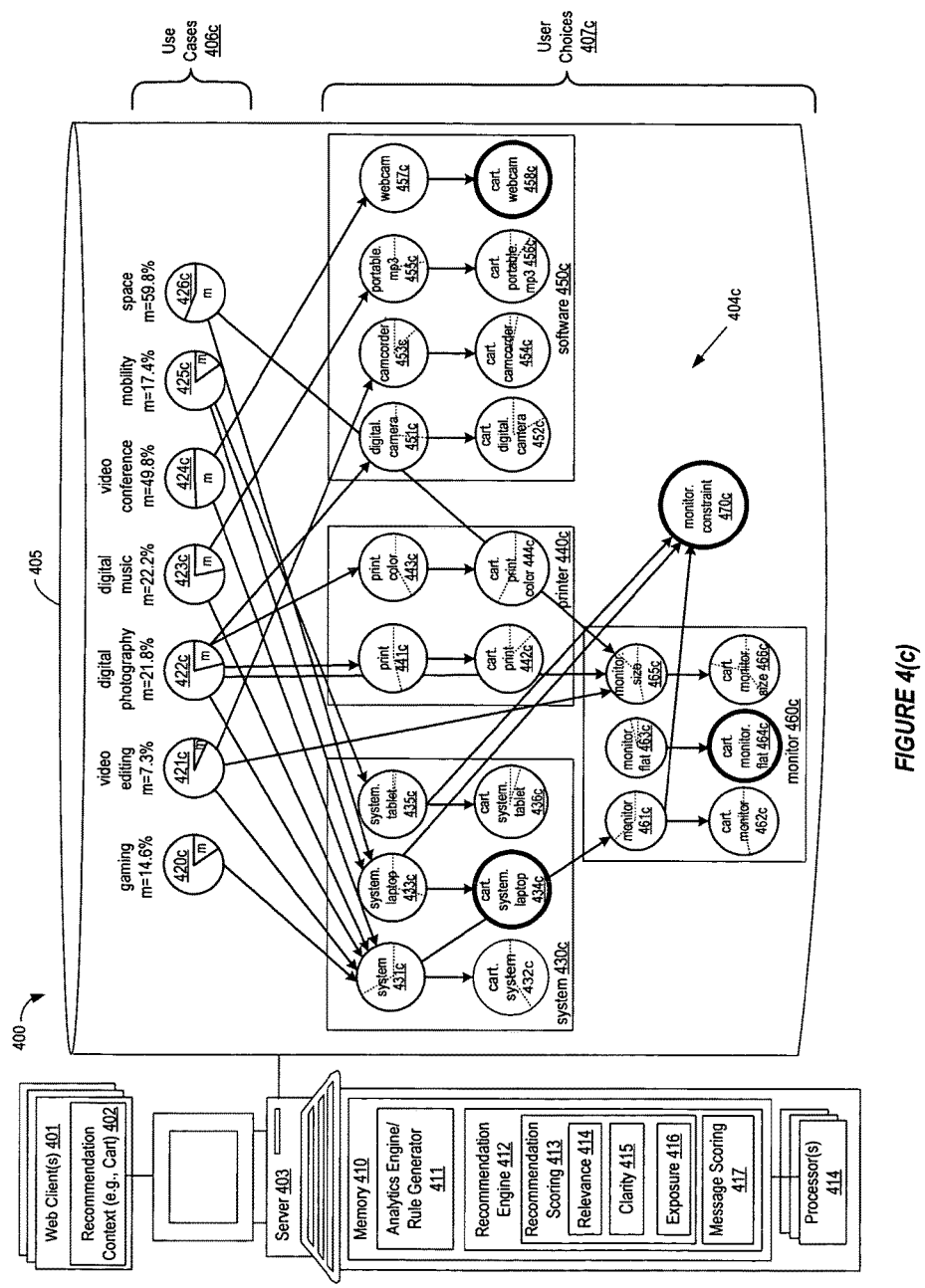

A similar approach can be used to score a plurality of selling point messages that might all apply to a candidate recommended item so that the highest scoring message can be selected and issued with the candidate recommendation. For example, if there are more than one selling point messages that might be used with a predetermined candidate recommendation, the recommendation context information (e.g., items in the customer's cart 402 or derivative derived therefrom) is extracted and used to set decision nodes in the user choices 407. Once the user choice decision nodes are set, the probability distribution for the user case profiles 406 may be inspected and used to select the selling point message for use with the candidate recommendation. This may be illustrated in FIG. 4(c), where the cart.system.laptop 434c, cart.monitor.flat 464c and cart.webcam 458c items have been set in response to the recommendation context from the cart 402. As a result, there is a 14.6% chance of matching the gaming profile (node 420c), a 7.3% chance of matching the video editing profile (node 421c), a 21.8% chance of matching the digital photography profile (node 422c), a 22.2% chance of matching the digital music profile (node 423c), a 49.8% chance of matching the video conference profile (node 424c), a 17.4% chance of matching the mobility profile (node 425c), and a 59.8% chance of matching the space profile (node 426c). Upon ranking these user profile case probabilities from highest to lowest, the highest ranking profile (e.g., the "space" profile) would be used to select the selling point message from a plurality of selling point messages which matches the highest ranking profile. Alternatively, the probability distribution over the possible use cases 406c are used to evaluate and rank selling point messages for each candidate recommendation by taking into account a quality of pitch measure for each selling point message with respect to each possible use case. Thus, the user case profile probabilities can be used alone to score the selling point messages, or a combination of the user case profile probabilities and the respective pitch strength indications for each selling point message can be combined to score and select the selling point message. In addition, the relative score of the selected selling point message may also be included in the scoring of the candidate recommendation.

In the system depicted in FIG. 4(a), a data processing system 400 is provided for generating and scoring candidate recommendations and/or selling point messages for a computer retailer using a probabilistic network 404. The depicted recommendation selection system 400 (e.g., a private wide area network (WAN) or the Internet) includes a central server computer system 403 and one or more networked client or server computer systems 401 that are connected to the network. Communication between central server computer system 403 and the networked computer systems 401 typically occurs over a network, such as a public switched telephone network over asynchronous digital subscriber line (ADSL) telephone lines or high-bandwidth trunks, for example, communications channels providing T1 or OC3 service. Networked client computer systems (e.g., 401) typically access central server computer system 403 through a service provider, such as an internet service provider ("ISP") by executing application specific software, commonly referred to as a browser, on the networked client computer systems 401. A database 405 connected to or accessible by the server 403 stores a transaction database or order history data of items included in one or more prior transactions (not shown), and also stores a probabilistic network 404. In a selected embodiment described herein, the probabilistic network 404 may be used to identify candidate recommendations by using the customer's purchase decisions reflected in the cart 402 to identify the most likely matching user profile, which in turn is used to identify items corresponding to the user profile for possible recommendation. In addition or in the alternative, an analytics engine 411 uses the order history data to generate association rules using any of a broad variety of efficient algorithms for mining association rules have been developed in recent years, including algorithms based on the level-wise Apriori framework, TreeProjection and FPGrowth techniques. The association rules may then be filtered using minimum support or confidence requirements. As will be appreciated, other techniques for generating candidate recommendation rules may be used in connection with the present invention, which is not limited to only using association rules, and algorithms like Apriori, FPGrowth, etc.

Once the association rules are finalized by the rule generator 411 (which may optionally include an optimization to remove redundant rules), the recommendation engine 412 is invoked to process the recommendation context information generated by the cart 402 to identify potentially matching association rules which are to be further processed for possible issuance as recommendations. To this end, the recommendation context 402 or a derivative thereof may be used by the recommendation engine 412 to identify association rules from the mined rules that match the recommendation context 402. For example, the recommendation engine 412 may generate a list of candidate rules whose trigger evaluated to true in response to the recommendation context 402. Very often, this process can result in many recommendations being produced for a given recommendation context.

To avoid overwhelming the customer with recommendations, it may be desired to choose one or more recommendations (a configurable number) for display to the customer. This can be done by programming the processor 414 to prioritize the list of candidate recommendation rules using a recommendation scoring process 413 which scores and sorts each candidate recommendation rule using predetermined scoring criteria (such as relevance 414, clarity 415 and exposure 416) with the probabilistic network to determine which of the candidate recommendations provides the largest boost in expected margin resulting from the recommendation being issued, as compared to the recommendation not being issued. In a selected embodiment, the recommendation selection process uses a Bayesian network to model the relationship between the purchase probabilities for a set of candidate recommendations based on each recommendation's relevance, exposure and clarity, both before and after the recommendation is made. For each candidate recommendation, the difference between the purchase probabilities may be multiplied the item's margin to obtain the expected incremental margin, and this value is used to score the candidate recommendation against the other candidate recommendations.

Other scoring criteria may also be used by the recommendation scoring process 413, such as a pitch strength criterion for each candidate recommendation. While the pitch strength criterion may be a subjective variable that is assigned when the selling messages are input to the recommendation message generator, the probabilistic network (e.g., 404c shown in FIG. 4(c)) may also be used to pick a selling point message having an associated pitch strength criterion that increases the expected value of a recommendation, given the likelihoods of the customer's imputed goals. This can be done by programming the processor 414 to select from a plurality of selling point messages corresponding to a candidate recommendation using a message scoring process 417 which sets the user choices 407c to reflect the recommendation context 402. The message scoring process 417 then ranks the profiles by probability to determine which user case profiles 406 most likely match the recommendation context, or otherwise determines a probability distribution over the possible use cases or profiles. Based on the use case rankings or probability distribution information, the message scoring process 417 can then select the selling point message with the highest expected score for use with the scoring and issuance of the candidate recommendation.

Figure 5:
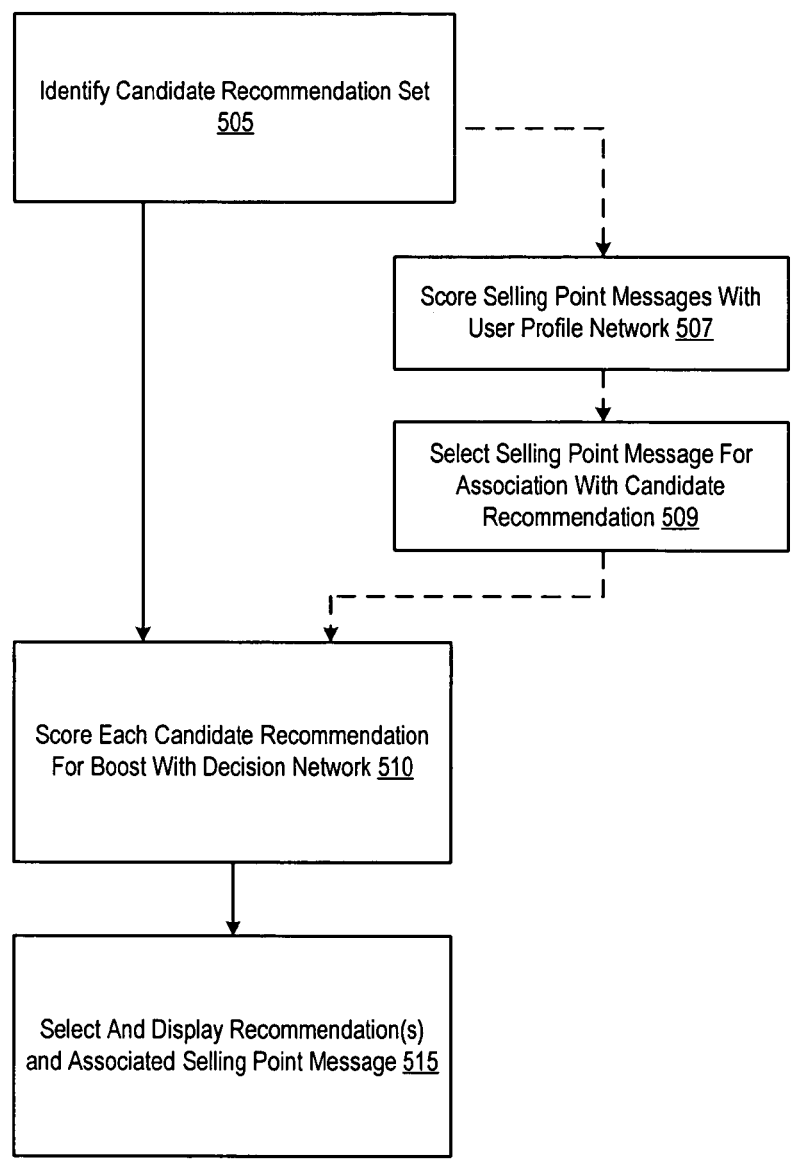
FIG. 5 shows a flowchart that schematically illustrates a process for prioritizing retail recommendations using one or more probabilistic networks according to various illustrative embodiments of the present invention.

Turning now to FIG. 5, a flowchart schematically illustrates various process embodiments for prioritizing retail recommendations and/or selling point messages using one or more probabilistic networks according to various illustrative embodiments of the present invention. Though selected embodiments of how to score candidate recommendations and messages are illustrated in FIG. 5, it will be appreciated by those of ordinary skill in the art that the sequence of illustrated steps may be modified, reduced or augmented in keeping with the disclosure of the present invention. For example, any one or more of the scoring steps (e.g., steps 507 and 509) may optionally be included or excluded. Thus, it will be appreciated that the methodology of the present invention may be thought of as performing the identified sequence of steps in the order depicted in FIG. 5, though the steps may also be performed in parallel, in a different order, or as independent operations that are combined to obtain a score for the candidate recommendation rule.

The description of the illustrative methodologies for prioritizing recommendations can begin at step 500, where the recommendation context is obtained. The mechanics of obtaining the recommendation context can be accomplished by a variety of ways, such as by retrieving quote information from the customer cart or by obtaining information from outside of a cart, such as from a simple product page, a configuration page, or even a user's click-path/browse-path/user session history. Using the recommendation context, the mined rules matching the recommendation context are selected as the set of candidate recommendations at step 505. At step 510, each recommendation in the set of candidate recommendations is scored by evaluating the incremental expected profit margin resulting from the recommendation being issued, as compared to it not being issued. In a selected embodiment, this evaluation may be performed using a probabilistic decision network (such as a Bayesian network) in which predetermined scoring criteria for each candidate recommendation (including the relevance, exposure and/or clarity) are used to model the customer's decision-making process, thereby providing a purchase probability value for each candidate recommendation. Additional scoring criteria may also be used at step 510. The scoring process continues with each candidate recommendation until all candidate recommendations have been scored, at which time the scored candidate recommendations are ranked or sorted by score value to select one or more of the highest scored recommendations, along with any associated selling point message, for display to the customer (step 515).

In addition to scoring each of the candidate recommendations for the boost in expected profit, a selected embodiment of the present invention also uses a probabilistic network to score and select a selling point message for association with each candidate recommendation and even for use with the scoring of the candidate recommendation. In particular, selling point messages that could apply to a given candidate recommendation are scored based on an assessment of the likely user profile at step 507. In a selected embodiment, the assessment may be performed using a probabilistic user profile network (such as a Bayesian network) wherein the recommendation context is used to set user choice nodes. With the user choices identified in the cart being set, user case profile probabilities may be extracted from the user profile network and ranked in order of probability. Once the user case profiles are ranked, the selling point messages may also be ranked by profile when each selling point message includes a reference user profile indication. And at step 509, the highest ranked selling point message may be selected for association with the candidate recommendation. In this way, a selling point message is provided that is dynamically tailored to the particular customer or item being recommended. This may be illustrated with reference to FIG. 1, where, in response to a candidate recommendation rule (e.g., R1) being provided to the recommendation message generator 40, the message selector 44 determines the optimal selling point/message text for each candidate recommendation (e.g., R1) by using a probabilistic user profile network to identify the most likely user case profile derived from the recommendation context. The identified user case profile is then used to index into a table of selling point text messages for the candidate recommendation R1 stored in the message database 42. In a selected implementation, a lookup table approach may be used whereby the identified user case profile and candidate recommendation are used to key into the lookup table in order to output a predetermined selling point text corresponding for the candidate recommendation.

In addition to using the ranked user case profiles to score and rank selling point messages, scoring may also be determined by using a combination of the user case profile probabilities and a pitch strength indication for each selling point message. For example, let's assume there are three selling point messages M1, M2, M3 for a candidate recommendation R1, where message M1 is message directed to a "gaming" profile, message M2 is directed to a "video editing" profile and message M3 is directed to a "digital photography" profile. In addition, the respective pitch strength values for the selling point messages M1, M2, M3 are assumed to be 0.1 (M1), 0.5 (M2) and 0.8 (M3). If the recommendation context information indicates that the customer has a 10% probability of fitting the "digital photography" profile (M3), a 70% probability of fitting the "gaming" profile (M1) and a 20% probability of fitting the "video editing" profile (M2), then the top ranked message would be M2 (0.5×0.2), followed by M3 (0.8×0.1), followed by M1 (0.1×0.7).

The disclosed techniques for scoring and selecting selling point messages may also be used in the scoring and selection of candidate recommendations. This may be illustrated with reference to FIG. 2, wherein the pitch quality input node 218 is determined using a message scoring and selection process, such as described with reference to FIG. 4(c). With this implementation, the parameterization table for node 218 may be configured to output the probability associated with the most likely user case profile that is used to select the selling point message for the candidate recommendation being scored. Alternatively, the parameterization table for node 218 may be configured to output a value based upon the distribution of user case profile probabilities and/or a pitch strength indication for the selected selling point message.

In an exemplary embodiment, the system and method for scoring recommendations and explanations may be implemented with a data processing system that processes transaction database information to provide association rules, to score and prioritize matching association rules using predetermined scoring criteria, and to generate selling point/message texts in response to one or more of said scoring criteria. For example, data processing may be performed on computer system 403 which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 403 includes one or more microprocessor or central processing units (CPU) 414, mass storage memory 405 and local RAM memory 410. The processor 414, in one embodiment, is a 32-bit or 64-bit microprocessor manufactured by Motorola, such as the 680X0 processor or microprocessor manufactured by Intel, such as the 80X86, or Pentium processor, or IBM. However, any other suitable single or multiple microprocessors or microcomputers may be utilized. Computer programs and data are generally stored as instructions and data in mass storage 415 until loaded into main memory 410 for execution. Main memory 410 may be comprised of dynamic random access memory (DRAM). As will be appreciated by those skilled in the art, the CPU 414 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary skill in the art will recognize that the foregoing components and devices are used as examples for the sake of conceptual clarity and that various configuration modifications are common.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the probabilistic network data structures so as to improve the scoring of candidate recommendations and selling point messages. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based data processing system described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: retail, enterprise and consumer electronics, general retailers, computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method of enabling a computer system to score recommendations for potential purchase by a customer and provide candidate recommendations, comprising:
   transforming a computer system programmed with code stored in a memory and executing by a processor of the computer system to configure the computer system into a machine for performing:
      receiving recommendation context digital data of the customer;
      processing the recommendation context digital data, by evaluating which association rules match the recommendation context digital data and removing association rules with a filter that do not meet a recommendation strength threshold, to identify a plurality of candidate recommendations that match the recommendation context digital data in accordance with association rules not removed, where each candidate recommendation recommends at least one recommended item;
      determining a computer system useable score for each candidate recommendation by applying a probabilistic purchase decision model to score an effectiveness of each candidate recommendation by comparing a recommendation outcome against a non-recommendation outcome;
      ranking the plurality of candidate recommendations using the score for each candidate recommendation to identify at least a highest ranking candidate recommendation;
      selecting the candidate recommendation having the highest score for issuance to the customer; and
      providing digital data representing the candidate recommendation to a computer system accessible to the customer.

2. The method of claim 1 wherein the code further executes by the processor of the computer system to configure the computer system into the machine for performing:
   selecting a message selector that uses a probabilistic use case model to choose, for each candidate recommendation, a selling message, thereby generating a recommendation, message pair for each candidate recommendation.

3. The method of claim 2 wherein the code further executes by the processor of the computer system to configure the computer system into the machine for using the probabilistic purchase decision model to choose a candidate recommendation based on the recommendation, message pair that maximizes boost in expected margin resulting from the candidate recommendation being issued, as compared to the candidate recommendation not being issued.

4. The method of claim 1 wherein the code further executes by the processor of the computer system to configure the computer system into the machine that implements the probabilistic purchase decision model as a Bayesian network.

5. The method of claim 1 wherein the code further executes by the processor of the computer system to configure the computer system into the machine for:
   generating a selling point message for each candidate recommendation by:
      identifying a plurality of selling point messages corresponding to the candidate recommendation, where each selling point messages is targeted to a predetermined user case profile;
      identifying a first user case profile most likely matches the customer; and
      selecting a first selling point message from the plurality of selling point messages that is targeted to the first user case profile for use with the candidate recommendation.

6. The method of claim 1 wherein determining a score for each candidate recommendation by applying a probabilistic purchase decision model to score an effectiveness of each candidate recommendation by comparing a recommendation outcome against a non-recommendation outcome comprises:
   using a Bayesian network to calculate a first purchase probability measure for a candidate recommendation item, given a relevance measure for the item, an exposure measure for the item if the candidate recommendation is displayed and a clarity measure for the item if the candidate recommendation is displayed;
   using a Bayesian network to calculate a second purchase probability for the candidate recommendation item, given a relevance measure for the item, an exposure measure for the item if the candidate recommendation is not displayed and a clarity measure for the item if the candidate recommendation is not displayed;
   subtracting the second purchase probability measure from the first purchase probability measure to form a first difference value; and
   multiplying the first difference value by a margin value for the candidate recommendation item.

7. A non-transitory, computer readable medium comprising code stored therein to enable a computer system to score recommendations for potential purchase by a customer and provide candidate recommendations, wherein the code is executable by a processor to transform the computer system programmed into a machine for performing:
   receiving recommendation context digital data of a customer;
   processing the recommendation context digital data, by evaluating which association rules match the recommendation context digital data and removing association rules with a filter that do not meet a recommendation strength threshold, to identify a plurality of candidate recommendations that match the recommendation context digital data in accordance with association rules not removed, where each candidate recommendation recommends at least one recommended item;
   determining a computer system useable score for each candidate recommendation by applying a probabilistic purchase decision model to score an effectiveness of each candidate recommendation by comparing a recommendation outcome against a non-recommendation outcome;

ranking the plurality of candidate recommendations using the score for each candidate recommendation to identify at least a highest ranking candidate recommendation;

selecting the candidate recommendation having the highest score for issuance to the customer; and providing digital data representing the candidate recommendation to a computer system accessible to the customer.

8. The computer readable medium of claim 7 wherein the code further executes by the processor of the computer system to configure the computer system into the machine for performing:

selecting a message selector that uses a probabilistic use case model to choose, for each candidate recommendation, a selling message, thereby generating a recommendation, message pair for each candidate recommendation.

9. The computer readable medium of claim 8 wherein the code further executes by the processor of the computer system to configure the computer system into the machine for using the probabilistic purchase decision model to choose a candidate recommendation based on the recommendation, message pair that maximizes boost in expected margin resulting from the candidate recommendation being issued, as compared to the candidate recommendation not being issued.

10. The computer readable medium of claim 7 wherein the code further executes by the processor of the computer system to configure the computer system into the machine that implements the probabilistic purchase decision model as a Bayesian network.

11. The computer readable medium of claim 7 wherein the code further executes by the processor of the computer system to configure the computer system into the machine for:

generating a selling point message for each candidate recommendation by:

identifying a plurality of selling point messages corresponding to the candidate recommendation, where each selling point messages is targeted to a predetermined user case profile;

identifying a first user case profile most likely matches the customer; and selecting a first selling point message from the plurality of selling point messages that is targeted to the first user case profile for use with the candidate recommendation.

12. The computer readable medium of claim 7 wherein determining a score for each candidate recommendation by applying a probabilistic purchase decision model to score an effectiveness of each candidate recommendation by comparing a recommendation outcome against a non-recommendation outcome comprises:

using a Bayesian network to calculate a first purchase probability measure for a candidate recommendation item, given a relevance measure for the item, an exposure measure for the item if the candidate recommendation is displayed and a clarity measure for the item if the candidate recommendation is displayed;

using a Bayesian network to calculate a second purchase probability for the candidate recommendation item, given a relevance measure for the item, an exposure measure for the item if the candidate recommendation is not displayed and a clarity measure for the item if the candidate recommendation is not displayed;

subtracting the second purchase probability measure from the first purchase probability measure to form a first difference value; and multiplying the first difference value by a margin value for the candidate recommendation item.

13. A system comprising:

a processor;

a memory, coupled to the processor, wherein the memory includes code stored therein to enable the system to score recommendations for potential purchase by a customer and provide candidate recommendations, wherein the code is executable by the processor to transform a computer system programmed into a machine for performing:

receiving recommendation context digital data of a customer;

processing the recommendation context digital data, by evaluating which association rules match the recommendation context digital data and removing association rules with a filter that do not meet a recommendation strength threshold, to identify a plurality of candidate recommendations that match the recommendation context digital data in accordance with association rules not removed, where each candidate recommendation recommends at least one recommended item;

determining a computer system useable score for each candidate recommendation by applying a probabilistic purchase decision model to score an effectiveness of each candidate recommendation by comparing a recommendation outcome against a non-recommendation outcome;

ranking the plurality of candidate recommendations using the score for each candidate recommendation to identify at least a highest ranking candidate recommendation;

selecting the candidate recommendation having the highest score for issuance to the customer; and providing digital data representing the candidate recommendation to a computer system accessible to the customer.

14. The system of claim 13 wherein the code further executes by the processor of the computer system to configure the computer system into the machine for performing:

selecting a message selector that uses a probabilistic use case model to choose, for each candidate recommendation, a selling message, thereby generating a recommendation, message pair for each candidate recommendation.

15. The system of claim 14 wherein the code further executes by the processor of the computer system to configure the computer system into the machine for using the probabilistic purchase decision model to choose a candidate recommendation based on the recommendation, message pair that maximizes boost in expected margin resulting from the candidate recommendation being issued, as compared to the candidate recommendation not being issued.

16. The system of claim 13 wherein the code further executes by the processor of the computer system to configure the computer system into the machine that implements the probabilistic purchase decision model as a Bayesian network.

17. The system of claim 13 wherein the code further executes by the processor of the computer system to configure the computer system into the machine for:

generating a selling point message for each candidate recommendation by:

identifying a plurality of selling point messages corresponding to the candidate recommendation, where each selling point messages is targeted to a predetermined user case profile;

identifying a first user case profile most likely matches the customer; and selecting a first selling point message from the plurality of selling point messages that is targeted to the first user case profile for use with the candidate recommendation.

18. The system of claim 13 wherein determining a score for each candidate recommendation by applying a probabilistic purchase decision model to score an effectiveness of each candidate recommendation by comparing a recommendation outcome against a non-recommendation outcome comprises:

using a Bayesian network to calculate a first purchase probability measure for a candidate recommendation item, given a relevance measure for the item, an exposure measure for the item if the candidate recommendation is displayed and a clarity measure for the item if the candidate recommendation is displayed;

using a Bayesian network to calculate a second purchase probability for the candidate recommendation item, given a relevance measure for the item, an exposure measure for the item if the candidate recommendation is not displayed and a clarity measure for the item if the candidate recommendation is not displayed;

subtracting the second purchase probability measure from the first purchase probability measure to form a first difference value; and multiplying the first difference value by a margin value for the candidate recommendation item.

* * * * *